Feb. 25, 1958
L. HATKIN
2,825,059
CONICAL SCANNING SYSTEM
Filed Oct. 4, 1954
3 Sheets-Sheet 1
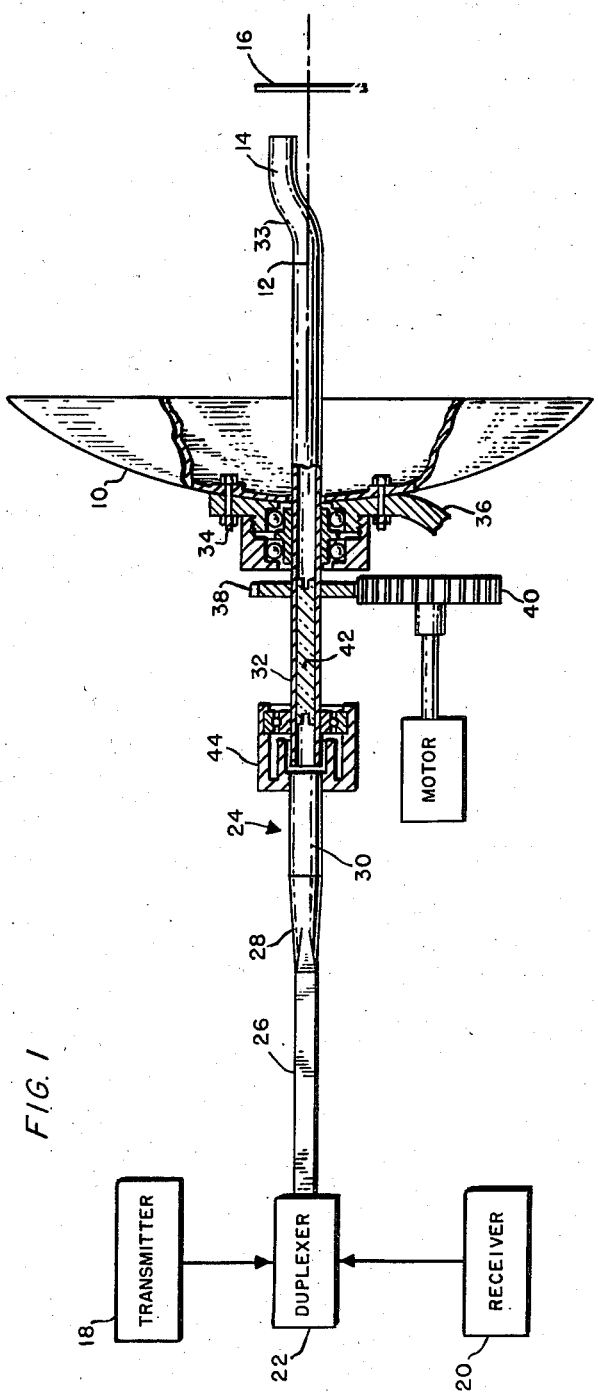
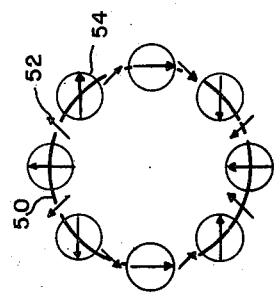
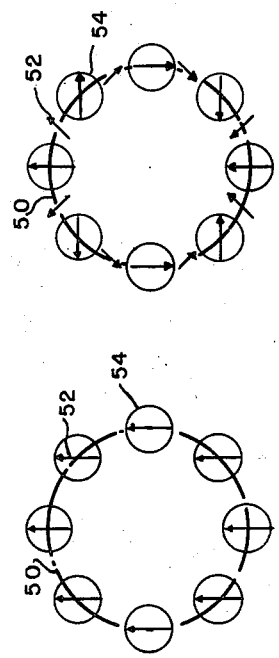
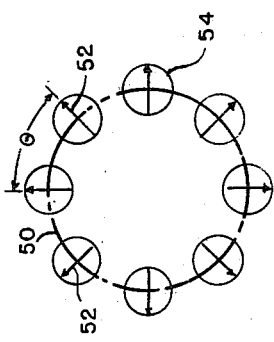
INVENTOR,
LEONARD HATKIN.
BY
*Harry M. Saragovitz*
ATTORNEY.

INVENTOR,
LEONARD HATKIN.
BY
Harry M. Saragovitz
ATTORNEY

Feb. 25, 1958  L. HATKIN  2,825,059
CONICAL SCANNING SYSTEM
Filed Oct. 4, 1954  3 Sheets-Sheet 3

INVENTOR,
LEONARD HATKIN.
BY
Harry M. Saragovitz
ATTORNEY

United States Patent Office 2,825,059
Patented Feb. 25, 1958

2,825,059
CONICAL SCANNING SYSTEM

Leonard Hatkin, Elberon, N. J., assignor to the United States of America as represented by the Secretary of the Army Application October 4, 1954, Serial No. 460,285

8 Claims. (Cl. 343—756)

(Granted under Title 35, U. S. Code (1952), sec. 266)

The invention described herein may be manufactured and used by or for the Government for governmental purposes, without the payment of any royalty thereon.

This invention relates to directional microwave antenna systems and more particularly to antenna systems employing a conical scan.

In tracking objects located by either reflected or radar beacon signals utilizing conical antenna scanning beams, either a rotating polarization system or a nutating system may be employed. The rotating system involves a pencil cosine-type beam adapted to rotate concentrically about the mechanical axis of the antenna so that the plane of polarization of the radiated signal is changing constantly in accordance with the rotation of the beam. For a target which does not discriminate against any polarization, the rotating system provides very good tracking information. The received signal may be closely approximated by the expression $1+K(\cos\theta-\psi)$ where $\theta$ is the angular displacement of the conical beam with respect to an assumed zero position and $\psi$ is the angle of position of the target with respect to the zero position. The expression $\cos(\theta-\psi)$ is known as the error signal and by determining the amplitude and phase of the error signal, the target may be located with respect to two orthogonal reference planes which may be designated as "$X$" and "$Y$." However, if the target reradiates a signal of essentially constant linear polarization, there is one plane from which tracking information is not available, and, in addition, a large error signal component of twice the frequency of that of the fundamental error signal is introduced. Furthermore, at low tracking angles, the different polarizations in the orthogonal planes result in different ground reflection coefficients. These effects are deleterious to the system performance inasmuch as they cause erratic tracking and reduced tracking range. For beacon tracking at extended ranges by the rotating system, another deleterious effect is added in that the radar will not trigger the beacon if the polarization is not correct. Hence, for rotating polarization radar, the returned signal will be chopped, and the amount of information obtained may be drastically reduced. The nutating type of antenna operates with the polarization remaining constant as the beam rotates. Although such a system overcomes some of the deleterious effects of the rotating polarization system, if the returned signal is incorrectly polarized, tracking accuracy and range are practically nil. Also, the nutating system is by necessity mechanically complex and may be more susceptible to detection and jamming.

It is therefore an object of the present invention to provide a conical scan system having the advantages of both the rotating polarization and nutating antennas but with the gross disadvantages of neither.

It is another object of this invention to provide a conical scan system less susceptible to detecting jamming and yet more accurately locate arbitrarily polarized targets.

In accordance with one embodiment of the present invention, there is provided a conical scanning antenna structure adapted to provide a narrow pencil beam of radiation characteristic. Included are means for supplying to the structure radio-frequency wave energy which is plane polarized and means at the output end of the supply means whereby the radiation characteristic is at a prescribed angle relative to the direction axis of the structure. Also included are means comprising a circular waveguide for rotating the characteristic at a prescribed rate about the direction axis to describe a conical scan and means included in the circular waveguide for rotating the plane of polarization at a rate higher than the scanning rate.

Another embodiment of the invention is directed to a method of describing a conical scan with a narrow pencil beam of directional radiation characteristic having plane polarized wave energy. The method consists of rotating the radiation characteristic at a prescribed rate about the axis of the antenna structure and rotating the plane of polarization at a rate higher than the scanning rate.

For a better understanding of the invention, together with other and further objects thereof, reference is had to the following description taken in connection with the accompanying drawings in which:

Figure 1 illustrates, partly in section, a typical embodiment of the present invention;

Figures 2A and 2B are diagrammatic representations of the mode of operation of the rotating and nutating systems respectively;

Figure 2C illustrates diagrammatically the operation of the present invention.

Figure 3:
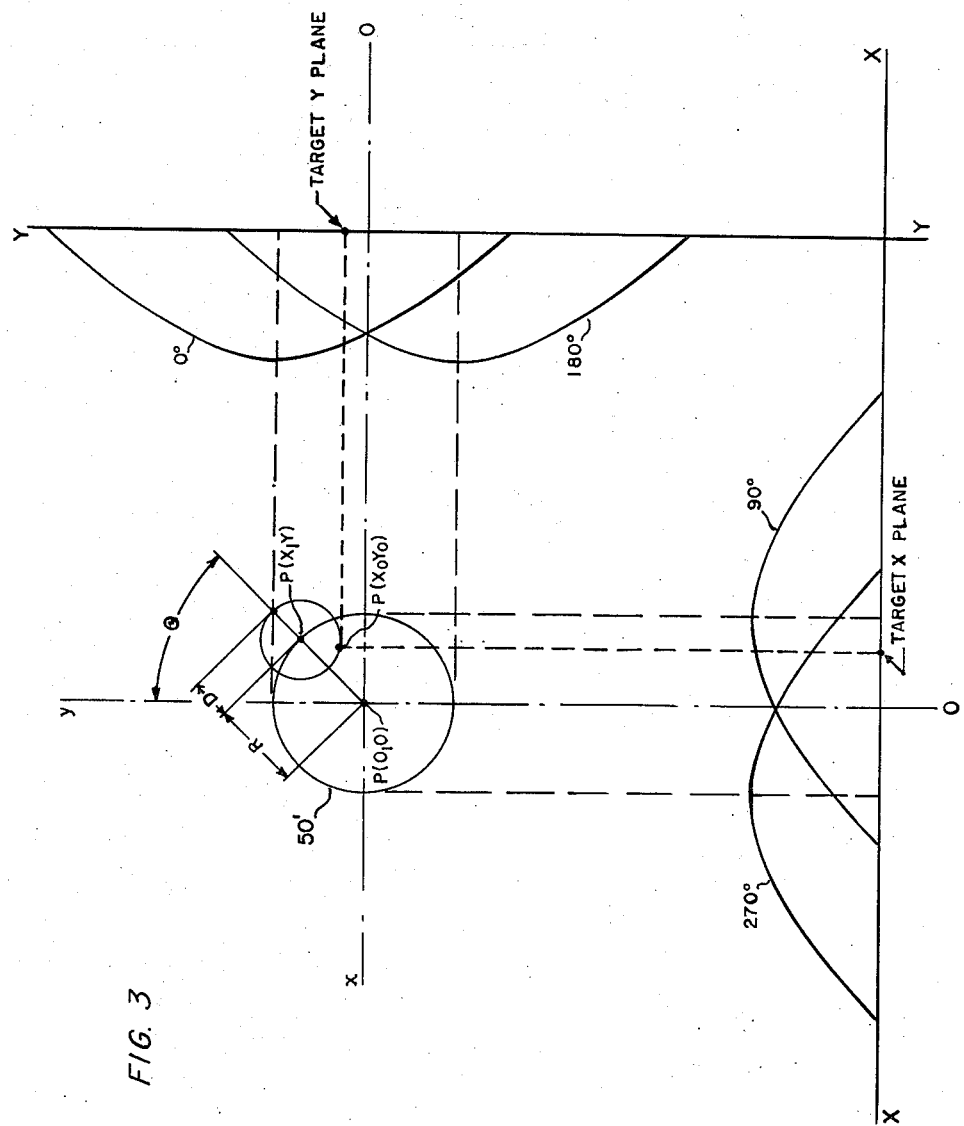
Figures 3, 4, 5, and 6 are explanatory curves, illustrating the operation of the invention.

Referring now to Figure 1 of the drawings, there is shown at 10 a parabolic reflector having an axis 12 hereinafter referred to as the axis of the antenna structure. The reflector is illuminated by a radiation source comprising a circular waveguide 14 terminated at the focus of the parabolic reflector and mechanically offset with respect to axis 12, and a primary reflector 16. The radiation source is coupled to a radio transmitting and receiving system, the components of which are shown at 18, 20, and 22, by means of a wave energy feed element 24 axially aligned with the axis 12 and including a rectangular waveguide 26, a waveguide transition section 28, a stationary circular waveguide 30, and a rotatably driven cylindrical waveguide feed line 32 which is integrated with offset radiation guide 14 by means of a suitable transition section as at 33. The rotating waveguide 32 is supported by a housing structure 34 which is in turn supported by a mount 36 thus holding the feed line 32 centered on the axis 12 of the parabolic reflector 10 and permitting it to be rotated about such axis. Rotation of feed line 32 is accomplished by means of a gear wheel 38 affixed to the outside of feed line 32 and adapted to mesh with motor-driven gear 40. Mounted longitudinally in a diametrical plane within axially rotatable feed guide 32 and rotatable therewith is a slab or plate 42 of a solid dielectric material, preferably polystyrene. Rotating feed guide 32 is coupled to a stationary cylindrical guide 30 by means of a conventional ball bearing choke joint 44.

For purposes of illustration it is to be assumed that the wave energy output from transmitter 18 is in the $TE_{0,1}$ mode; that the output wave energy at the radiation source is in the $TE_{1,1}$ mode, and that feed guide 32 and radiation source 14 rotate at a prescribed rate to provide a narrow pencil beam of directional radiation characteristic which describes a conical scan. The dielectric plate 42 has the effect of rotating the plane of polarization of the transmitted wave energy through an angle equal to twice the angle between the incident plane of polarization and the orientation of the dielectric plate. By such an arrangement, there is produced a conical scan wherein the polarization rotates twice as rapidly as the beam. It is to be understood, of course, that other suitable polarization rotators may be used and that the accuracy of the system may be improved by rotating the polarization at even high multiples of the beam rotation rate. For example, a rotating primary reflector incorporating a half-wave plate may be utilized so that the reflected polarization will be rotated twice as rapidly as the conical scan. In such a system the feed line remains stationary so that no rotating joints are required.

Figures 2A, 2B and 2C schematically illustrate the typical mode of operation of the rotating polarization system, the nutating system and the system embodying the present invention, respectively. In each of these figures circle 50 represents the locus of the lobe or beam center in a plane perpendicular to the general beam direction; line 52 represents the electric vector polarized as shown in the direction of the arrows; and circles 54 illustrate the angular beam position. It is apparent that for targets without polarization discrimination, the present invention will operate as well as the rotating system. However, from Figure 2C it can be seen that regardless of the polarization of the target, there are always available two orthogonal planes including the correct polarization. Thus, for any arbitrarily linearly polarized target, the position of the target can be much more accurately located than with the rotating system. Although higher frequency components of the error signal will be present, it will be shown below that the frequency of the largest component will be four times the fundamental frequency and hence much easier to filter out. Also the ground reflection of the system embodying the present invention is no more than in the case of the nutating antenna while the susceptibility to detection and jamming is, in general, less than that of the nutating antenna. Furthermore, for beacon tracking, it is evident that the target will be triggered twice as often as for the rotating polarization case with attendant gain in information.

In order to better understand the operation of the invention it would be advisable at this point to compare the relative error signals obtained from the conventional rotating and nutating systems and that of the present system.

Referring now to Figure 3, the circle 50' represents the locus of the lobe center in a plane perpendicular to the general beam and containing the target or beacon, and for greater clarity, it is to be assumed that the radar operates with a beacon of a prescribed polarized wave energy output. The position of the beams for values of $\theta$ equal to 0°, 90°, 180° and 270° are shown projected in the $x$ and $y$ planes respectively. At the target position the difference in amplitude between the two beams gives an indication of the error in the appropriate plane.

Thus in Figure 3, $P_{(0,0)}$ is a center point on the axis 12 of the antenna
$\theta$ = amount of rotation that lobe has experienced
$P_{(x,y)}$ is the instantaneous center of the lobe
$R$ is the distance of lobe center offset at the range of the beacon
$P_{(x_0,y_0)}$ = position of the beacon
$D$ = distance of beacon from lobe axis
$x$ and $y$ represent two orthogonal reference planes for centering the target.

From Figure 3, $$D = \sqrt{x_0^2 + y_0^2 + R^2 - 2R(x_0 \sin\theta + y_0 \cos\theta)} \quad (1)$$

The electrical field in the beam is a function of $D$ and may be assumed to have the form $$\cos n\frac{D}{R} \quad (2)$$

where $n$ is a function of the sharpness of the beam and has the value of .487 radian for a power crossover point of 80%, i. e., for $D=R$, $$\cos^2\left(.487\frac{R}{R}\right) = 0.80$$

For comparison purposes it will be assumed that the beacon has the coordinates $x_0=0$ and $y_0=R$, and the polarization will be such that the nutating system will receive the signal, then substituting these values for this special case in Equations 1 and 2 the signal for the nutating system $E_A$ is $$E_A = \cos(.689\sqrt{1-\cos\theta}) \quad (3)$$

Now, by expanding in a Fourier series of the form of $$\frac{A_0}{A_2} + A_1 \cos\theta + A_2 \cos 2\theta + \cdots$$

and calculating the first few terms numerically, the function in Equation 3 may be approximated to within 0.65% by the expression $$E_A = K(1 + .284 \cos\theta) \quad (4)$$

where the term involving $\cos\theta$ is the error signal which is used to direct the antenna to the target.

For the rotating polarization scan system, reference is again made to Figure 3 but in this case the polarization must be examined. Again, assuming that the beacon has a prescribed constant polarization direction $\beta$ and that polarization of the transmitted lobe will vary with its rotational position $\theta$, then the strength of detected signal will vary as $$|\cos(\beta - \theta)| \quad (5)$$

For the special case $x_0=0$ and $y_0=R$ and $\beta=\pi/2$, the received intensity of the signal $E_B$ for the rotating system becomes $$E_B = K(1 + .284 \cos\theta)\left|\cos\left(\frac{\pi}{2} - \theta\right)\right| \quad (6)$$

or $$E_B = K(1 + .284 \cos\theta)|\sin\theta| \quad (6a)$$

Now, using the Fourier expression for a rectified sine wave and multiplying terms, we have $$E_B = (K)\frac{2}{\pi}(1 + .189\cos\theta - .667\cos 2\theta - .038\cos 3\theta - .133\cos 4\theta \ldots) \quad (7)$$

For the present invention, electric intensity $E_C$ will be the same as that of Equation 6 with the exception that the polarization of the lobe now varies as $2\theta$ rather than $\theta$ and the intensity expression $E_C$ becomes $$E_C = K(1 + .284\cos\theta)|(\cos\beta - 2\theta)| \quad (8)$$

and for the same particular case of $x_0=0$, $y_0=R$ and $\beta=\pi/2$ we have $$E_C = K(1 + .284\cos\theta)|\sin 2\theta| \quad (9)$$

Expanding Equation 9 in a Fourier series and multiplying terms we have $$E_C = (K)2/\pi(1 + .284\cos\theta - .095\cos 3\theta - .667\cos 4\theta \ldots) \quad (10)$$

Figure 4:
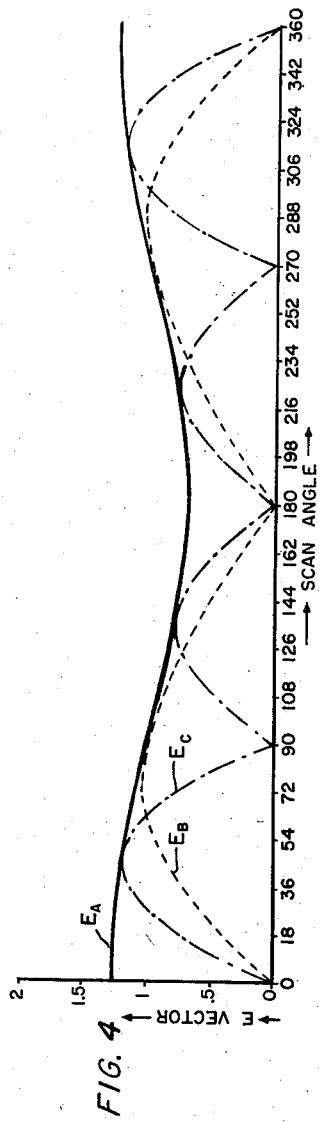

By comparing the normalized error terms in Equations 4, 7 and 10, i. e., the coefficients of the $\cos\theta$ term, it can be seen that the proposed system has an error signal which is 1.5 times as large as in the rotating polarization case. It is to be noted further from Equation 1 that the frequency of the largest component is four times the fundamental frequency so that the problem of filtering is a very simple matter as compared to the rotating system (Equation 7) where the $\cos 2\theta$ term is 3.5 times as large as the $\cos\theta$ error term. The three types of error signal are shown and compared in Figure 4 on a single curve.

In the above cases it has been assumed that the range is fairly short, so that a beacon target is essentially always being triggered. The advantages of the proposed system become more obvious and important in the case where the range is such that the beacon is not triggered when the polarization of the incoming beam differs from the beacon polarization by more than some critical angle. Such a case will now be compared for the rotating polarization system and the proposed present invention with a critical angle of 15° assumed. For that of the rotating system, the polarization factor will become a chopped sine function which has a Fourier expansion equal to:

$$2/\pi(.259)[1-1.9\cos 2\theta+1.7\cos 4\theta-1.28\cos 6\theta+\ldots] \quad (11)$$

while that of the present system will become a chopped sine function of twice the frequency since the polarization is changing twice as rapidly and is equal to:

$$2/\pi(.259)[1-1.9\cos 4\theta+1.7\cos 8\theta-1.28\cos 12\theta\ldots] \quad (12)$$

After multiplying the ideal error signal by the polarization factors and collecting terms, the total received signals for the two cases are respectively:

$$E_{B'}=K(.259)2/\pi[1+.014\cos\theta-1.9\cos 2\theta-0.284\cos 3\theta+\ldots] \quad (13)$$

for the rotating system, and $$E_{C'}=K(.259)2/\pi[1+.284\cos\theta-.27\cos 3\theta+1.7\cos 4\theta+\ldots] \quad (14)$$

for the present system.

Figure 5:
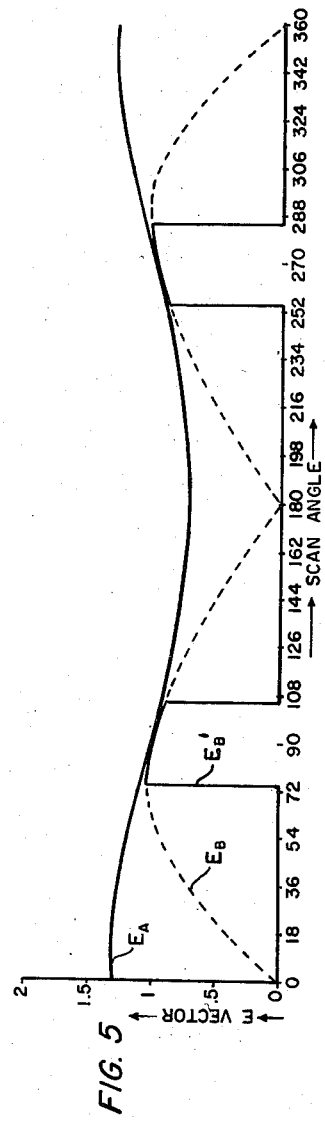
Figure 6:
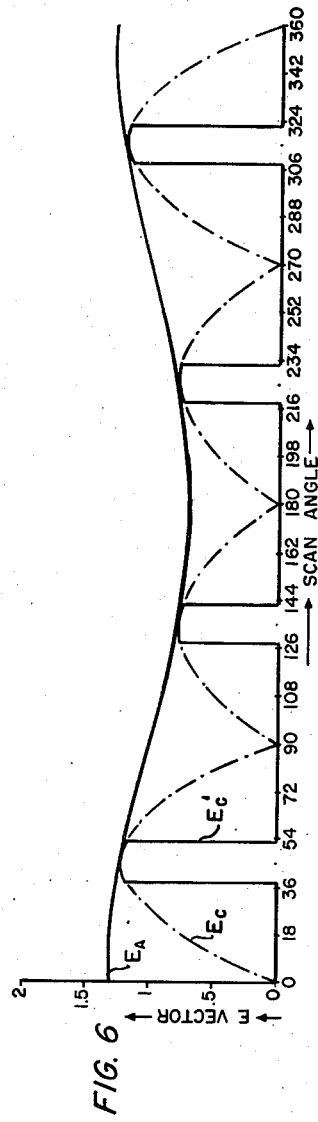

By comparing the coefficients of the $\cos\theta$ terms it is apparent that an improvement of 26 db has been effected in the desired error signal. It is seen from the graphic representations of these functions in Figures 5 and 6 that $E_{C'}$ is a far better approximation of $E_A$ than is $E_{B'}$ and hence the improved error signal.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A conical scanning antenna structure having a prescribed direction axis and adapted to provide a narrow pencil beam of a directional radiation characteristic comprising means for supplying to said structure radio-frequency wave energy which is plane polarized, means at the output end of said supply means whereby said pencil beam is at a prescribed angle relative to the direction axis of said structure, means for rotating said supply means at a prescribed rate whereby said characteristic describes a conical scan, and means included in said supply means for rotating the plane of polarization at a rate higher than said prescribed rate.

2. A conical scanning antenna structure having a prescribed direction axis and adapted to provide a narrow beam of a directional radiation characteristic at a prescribed angle relative to said axis comprising means for supplying to said structure radio-frequency wave energy which is plane polarized, means comprising a circular waveguide for rotating said beam at a prescribed rate about said direction axis to describe a conical scan, and means included in said circular waveguide for rotating the plane of polarization at a rate higher than said prescribed rate.

3. A conical scanning antenna structure having a prescribed direction axis and adapted to provide a narrow pencil beam of a directional radiation characteristic comprising a waveguide feed element including a circular waveguide for supplying to said structure radio-frequency energy which is plane polarized, means terminating said circular waveguide whereby said pencil beam is at a prescribed angle relative to the direction axis, means for rotating said circular waveguide at a prescribed rate about the direction axis of said structure whereby said characteristic describes a conical scan, and means within said circular waveguide and adapted to rotate therewith for rotating the plane of polarization at a rate higher than said prescribed rate.

4. The conical antenna structure in accordance with claim 3 wherein said last mentioned means includes a dielectric plate longitudinally positioned in a diametric plane within a portion of said circular waveguide.

5. A conical scanning antenna structure comprising a parabolic reflector having a prescribed axis and adapted to provide a narrow pencil beam of directional radiation characteristic, a circular waveguide feed axially aligned with said axis, the output end of said waveguide being terminated at the focus of said reflector and offset with respect to said axis, means for supplying to the input end of said circular waveguide radio-frequency energy which is plane polarized, means for axially rotating said circular waveguide at a prescribed rate whereby said characteristic described a conical scan, and means included in said waveguide and simultaneously rotatable therewith at said prescribed rate whereby the polarization at said output end rotates at twice the prescribed rate.

6. The conical antenna structure in accordance with claim 5 wherein said last mentioned means includes a dielectric plate longitudinally positioned in a diametric plane within a portion of said circular waveguide.

7. A directional antenna system comprising a parabolic reflector, a radiation source at the focus of said reflector and displaced from the axis thereof, a waveguide feed element integral with said radiation source for supplying plane-polarized radio frequency energy thereto and adapted to rotate at a prescribed rate, and means within said waveguide feed element for rotating the plane of polarization at a rate higher than said prescribed rate.

8. The directional antenna system in accordance with claim 7, wherein said waveguide element is cylindrical and said plane polarization rotating means includes a dielectric plate longitudinally positioned in a diametric plane within said cylindrical waveguide element.

References Cited in the file of this patent

UNITED STATES PATENTS 2,512,139    Cady    June 20, 1950